(12) United States Patent
Feliciano

(10) Patent No.: US 8,104,903 B2
(45) Date of Patent: Jan. 31, 2012

(54) 3-D INTERACTIVE NIGHTLIGHT

(76) Inventor: Marcos T. Feliciano, Bronx, NY (US)

( * ) Notice: Subject to any disclaimer, the term of this patent is extended or adjusted under 35 U.S.C. 154(b) by 383 days.

(21) Appl. No.: 12/319,120

(22) Filed: Dec. 31, 2008

(65) Prior Publication Data
US 2010/0165295 A1 Jul. 1, 2010

(51) Int. Cl.
G03B 21/14 (2006.01)
G02B 21/36 (2006.01)

(52) U.S. Cl. .......................... 353/119; 353/39

(58) Field of Classification Search ............... 353/6–10, 353/119, 122, 121, 43, 97; 362/35, 184, 362/234, 806, 644, 811, 641, 249.12, 249.13, 362/249.1, 808, 809; 40/429–436, 442–444; 359/815, 817, 819; 446/485, 243, 242, 233, 446/219, 149
See application file for complete search history.

(56) References Cited

U.S. PATENT DOCUMENTS

| | | | | |
|---|---|---|---|---|
| 5,759,044 A | * | 6/1998 | Redmond | 434/307 R |
| 6,883,918 B2 | * | 4/2005 | Yaniv | 353/79 |
| 7,871,192 B2 | * | 1/2011 | Chien | 362/641 |
| 2006/0209535 A1 | * | 9/2006 | Feliciano | 362/184 |

* cited by examiner

Primary Examiner — Que T Le
Assistant Examiner — Jennifer Bennett
(74) Attorney, Agent, or Firm — Feldman Law Group, PC

(57) ABSTRACT

Herein featured is a nightlight which can be worn by a user and displays projected images in two viewing modes. Mode one consists of projected images. Mode two; a silent interactive play video feature. For enhanced viewing there is a button spring release lens attachment enabling user to view the projected images and interactive adventure mode in another aspect. The interactive mode allows the user manipulation of the projected vehicle in real time within the display. The nightlight is also equipped with a pair of 3-D glasses. The panic mode feature allows the user to illuminate the body of the nightlight in the event that a user needs all the lights illuminated quickly, adding comfort.

6 Claims, 7 Drawing Sheets

3-D INTERACTIVE NIGHTLIGHT

RELATED APPLICATIONS

This application claims the priority of U.S. Pat. No. 7,329, 035 filed Mar. 16, 2005.

FIELD OF THE INVENTION

This invention is directed to a three dimensional (3-D) nightlight, more particularly, the nightlight of this invention can be readily worn on the wrist by a user and is provided with a projection assemblage and associated lens that are capable of projecting illuminated images on a surface in a 3-D geometric configuration, the nightlight is also provided with means to rotate the projected images. The invention also has a lens extension on the body of the nightlight that enables the user to see the projected images in another aspect of 3-D. In addition, the nightlight also has viewing means in the form of 3-D glasses, for example, prism style lens, providing additional entertainment as the different light frequencies are displayed; the nightlight also has means to illuminate the body of the invention in the form of a glow-in-the-dark material and a panic mode that activates the blast away feature of the invention providing an additional comfort in the dark. The 3-D Nightlight also has an interactive nightly adventure mode allowing the user to journey on various adventures while simultaneously controlling the travel vehicle during each mission.

BACKGROUND OF THE INVENTION

Many articles and devices have been designed and manufactured for use as a nightlight. In general, these articles and devices are intended to not only amuse a user, but to also provide a means of comfort. Illustrative of such articles and devices are those discussed below.

For example, U.S. Pat. No. 2,024,261 (Gaskin) discloses a flashlight equipped with a holster so that it can be secured on an arm.

U.S. Pat. No. 3,026,640 (Ogdon) discloses a toy gun having a viewing scope similar to a sighting scope used on a real weapon.

U.S. Pat. No. 3,401,596 (Hirach) discloses a projection apparatus having a flashlight that is equipped with a lens having a decalmania affixed thereto.

U.S. Pat. No. 3,576,710 (Taylor) discloses a toy pistol projector having a fixed local length system and means to advance film by the pistol.

U.S. Pat. No. 4,823,240 (Shenker) discloses an audio-visual assembly for garments.

U.S. Pat. No. 5,321,449 (Coccoli, et al,) discloses a projecting flashlight capable of receiving an insatiable slide in a transverse slot position in an enlarged head enabling an illuminated image from the slide to be projected onto a viewing surface.

U.S. Pat. No. 5,367,349 (Zeiler) discloses an amusement projector having a dynamic silhouette-producing mask mounted on a motion rod.

U.S. Pat. No. 5,667,293 (Own) discloses flashlight having an illumination and alerting effect system.

U.S. Pat. No. 4,707,127 (Kain) discloses a three dimensional image viewing apparatus that includes a filmstrip having a plurality of images.

U.S. Pat. No. 6,443,590 B1 (Lovitt) discloses an article such as wearing apparel having a lateral animation display.

U.S. Pat. No. 6,550,930 B1 (Portcouche) discloses a wrist mounted illumination device.

U.S. Pat. No. 4,285,028 (Sundin et al.) discloses a combination bedroom lamp and clock.

U.S. Pat. No. 5,517,264 (Sutton) discloses a decorative night light having a display panel for display of an image.

While the foregoing articles and devices are of interest and area are useful, typical methodologies for using a nightlight to assist a user in the dark all have one major set back; they do not disclose or suggest a nightlight that is worn on the wrist and capable of projecting 3-D illuminated images that can be moved while simultaneously rotating those images on a viewing surface, viewing said projected images through 3-D glasses and/or the 3-D lens extension adding a prism visual effect to the images and a panic mode feature which is capable of illuminating a designated light frequency to an area. The nightly adventure mode is an added bonus that allows interactive play between the users the images and the videos displayed. The body of the invention has a glow-in-the-dark feature providing additional illumination.

SUMMARY OF THE INVENTION

The 3-D Nightlight of the present invention overcomes the problems associated with the prior art. Users of various ages would enjoy the nightlight because most are often afraid of the dark and can benefit from the light and additional entertainment. For example, these users have difficulty falling asleep and some need to be comforted and reassured as they wait to fall asleep. The 3-D Nightlight of this invention not only provides such users with a form of comfort, but it also amuses them and imparts a form of reassurance and security until sleep over takes them. If a user is startled and needs the panic mode, activating the button, the user in essence, would blast away the darkness that surrounds them in the form of lasers, attacking jets, hearts that appear to dissolve, etc. In addition, the nightlight of the invention has an interactive play feature, allowing control of the explorer vehicle in the interactive videos. The nightlight of the invention is simple, easy and safe to use.

In general the 3-D Nightlight can be activated with the power button located at the bottom of said invention, however a power button can be located any where on the body of the invention, the light of the present invention projects a beam outward through lens having images that will appear as in a 3-D state along the desired surface or element, while safe to the user, the light would overcome the immediate darkness in forms familiar with the user, for example, the boy's' 3-D Nightlight would illuminate in the form of a laser blast, while the girl's' version would illuminate in the form of hearts blasting away the darkness. The present invention is comprised of, an elongated casing or housing having an oblate rear end and an oblate front end; a power source within said casing or housing means to activate and deactivate said power source, including panic mode; a projection assemblage within said casing or housing adjacent its front oblate end; a plurality of images on projection assemblage; means to illuminate said images; a pop up 3-D lens; and a pair of 3-D glasses, preferably prism type, that are capable of separating the wavelengths of light and turning them into simple prisms. The nightly adventure feature allows the user to interact with the video and 3-D images.

In one embodiment, for example, the elongated casing or housing can be comprised of, but not limited to, glow-in-the-dark and non-fluorescent material.

In another embodiment, for example, the power source can be comprised of, but not limited to, an electrical battery pack.

In another embodiment, for example, the means to rotate the projection assemblage can use a device that converts electrical current into mechanical energy such as a micro motor.

In another embodiment, the projection assemblage can be comprised of but not limited to, an image-bearing member having six lens, preferably embossed or engraved, with an image and a light emitting device carrying said member nested within said image bearing member.

In still a further embodiment the activation and deactivation means to initiate said power source and panic mode, for example, can be in the form of an electrical switch, button, touch sensitive sensors and the like.

In a further embodiment of the invention the illuminating means includes a plurality of light emitting elements such as, but not limited to, LED's (Light Emitting Diodes). The light source may be of any variety of bulbs, but preferably that of Light Emitting Diode's, that can provide the illumination associated with the light emitting device carrying member, with lens that are capable of providing a 3-D effect and a light source within said member.

In another embodiment of the invention the means to view the additional 3-D light waves are in the form of a 3-D lens attached to the body of the invention that is activated by a pop up mechanism and when viewed through said lens provides additional visual light spectrums. In addition, a pair of 3-D glasses, prism type, will add entertainment as the different light frequencies are viewed in their dancing array.

In another embodiment of the invention, the interactive nightly adventure feature contains a memory card that contains the data for the adventure and allows the information to be downloaded and played in said projection assemblage by means of the interactive hardware. In addition, with the 3-D lens and or glasses, the interactive experience would be user friendly.

The nightlight of the invention also includes means of, for example, a stretch sleeve so the nightlight can be worn on the lower arm of a user.

These and further embodiments of the invention are set forth in more detail herein below.

BRIEF DESCRIPTION OF THE DRAWINGS

The 3-D Nightlight of the invention is further demonstrated by the following drawing overview.

DETAILED DESCRIPTION OF THE DRAWINGS AND THE INVENTION

Figure 1:
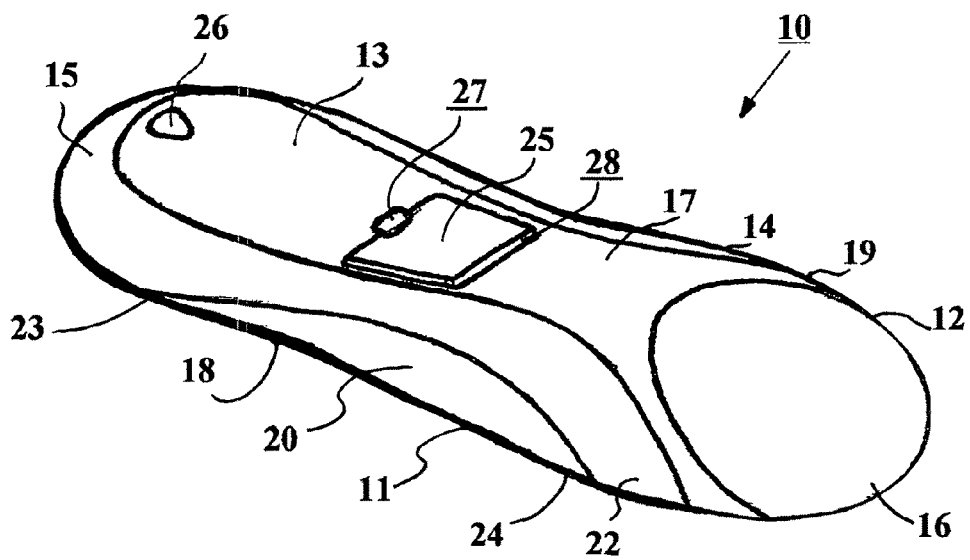
FIG. 1 is a perspective view of one geometric configuration of the 3-D Nightlight of the invention.

The 3-D Nightlight of the invention will be better understood from the ensuing description when taken together with the accompanying drawing wherein like reference numerals denote like parts.

The 3-D Nightlight of the invention, generally identified by reference numeral 10 in FIG. 1, is in the form of an elongated casing or housing 11. Although the casing or housing 11 of the 3-D Nightlight 10 can be provided in any geometric configuration or form such as cylindrical, oblong, rectangular and the like. Preferably, the casing or housing of the nightlight of the invention is provided in the geometric configuration shown in FIG. 1 which is in the form of an erogeric configuration having a front oblate section 12 and a rear oblate section 13. The front and rear oblate sections 12 and 13 are connected by a pinched or tapered mid section 14. The rear oblate section 13 has a closed end 15 while the front oblate section has an exposed end 16. The casing or housing 11 formed by the oblate sections 12 and 13 and mid-section 14 has a top 17, a bottom 18 and opposed sides 19 and 20. As used throughout the application and in the appended claims, the term "erogeric configuration" is intended to mean and should be understood as meaning the description thereof set forth herein above and as illustrated in FIGS. 1, 4 and 6-9.

Seated on the top 17 of the casing or housing 11 is a tension spring 28 3-D lens 25 which serves as an additional means of viewing the projected images and interactive mode in a 3-D prism aspect. To initiate lens there is a push button 27, designed to release the tension spring 28 allowing the position of the lens to change from a horizontal position to a vertical position. In addition, top 17 of the casing or housing 11 also has means to activate the power source for the panic mode. For example, there is a conventional on-off button 26 as described more fully herein below. The on-off button 26 allows all lights of the 3-D Nightlight to illuminate simultaneously. The on-off button mechanism of the nightlight may be toggled, trigger-activated or touch sensitive as described herein. Other types of button mechanisms, including automated button may be suitable to power on the 3-D nightlight, however illustrating only the preferred embodiment of a button activation which is intuitive to use.

The 3-D Nightlight is equipped with a pair of prism 3-D glasses providing additional entertainment as the different light frequencies are viewed. The micro processing interactive module 38 comprised of a micro media data projection module 36 in the form of two micro projectors 36c and 36d. The micro data device 38 streams data comprised of video upon insertion of memory device 57 and initiates interactive feature mode. The memory device 57 is a medium storing data file device, and referred to as a memory device. The micro media data projection module 36 contains within two micro projectors 36c and 36d. Micro projector one 36c displays the background video and stationed on the lower part of the projection module. Micro projector two 36d displays the 3-D interactive vehicle and positioned immediately on top of micro projector one 36c within the projector module 36 on a soft spring member 36e. The soft spring member 36e allows the back, forth and side to side movement of micro projector two 36d and the projected vehicle producing a gyroscopic effect for the vehicle. The activated media data projection module utilizes both projectors simultaneously producing the 3-D interactive feature effect.

In FIG. 1 the opposed sides 19 and 20 of the casing or housing 11 can be provided with a commercially available plastic, rubber and the like, but preferably, glow-in-the-dark soft plastic material 22 to absorb any shock should the 3-D nightlight be dropped or fall onto a hard surface. The pop up 3-D lens 25 is located on the top 17 section of the nightlight.

Figure 2:
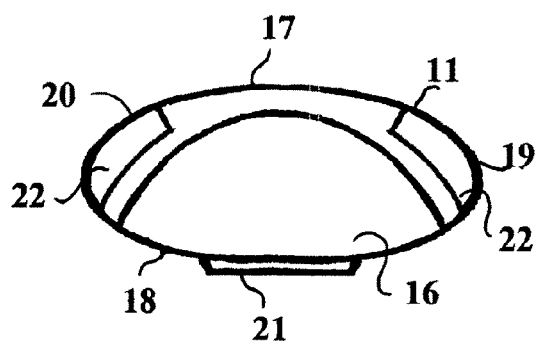
FIG. 2 is an elevation view of the front, projecting end of the nightlight shown in FIG. 1 when the power source is deactivated.
Figure 3:
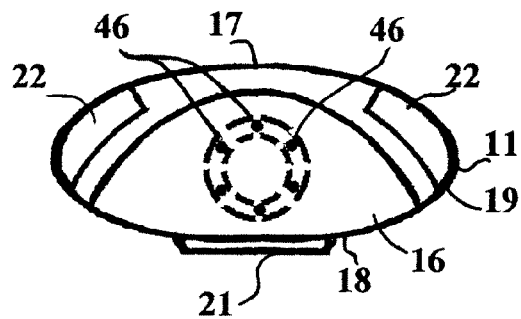
FIG. 3 is an elevation view of the same as FIG. 2 showing the activated light emitting element when the power source is initiated.

In FIGS. 2 and 3 illustrated is the front exposed end 16 of the casing or housing 11 when the illumination means are unlit (FIG. 2) and when the illumination means are lit (FIG. 3) showing the activated light emitting elements 46 as described in more detail herein below. The exposed front oblate end 41 (FIG. 4) is secured, but not limited to, the inner end of the housing by conventional means such as a snap-fit engagement, mating screw threads, and the like. The power button 21 activates the projection assemblage. Any number of combinations of light emitting elements may be used, all of which would be considered under the scope of the present invention.

Figure 4:
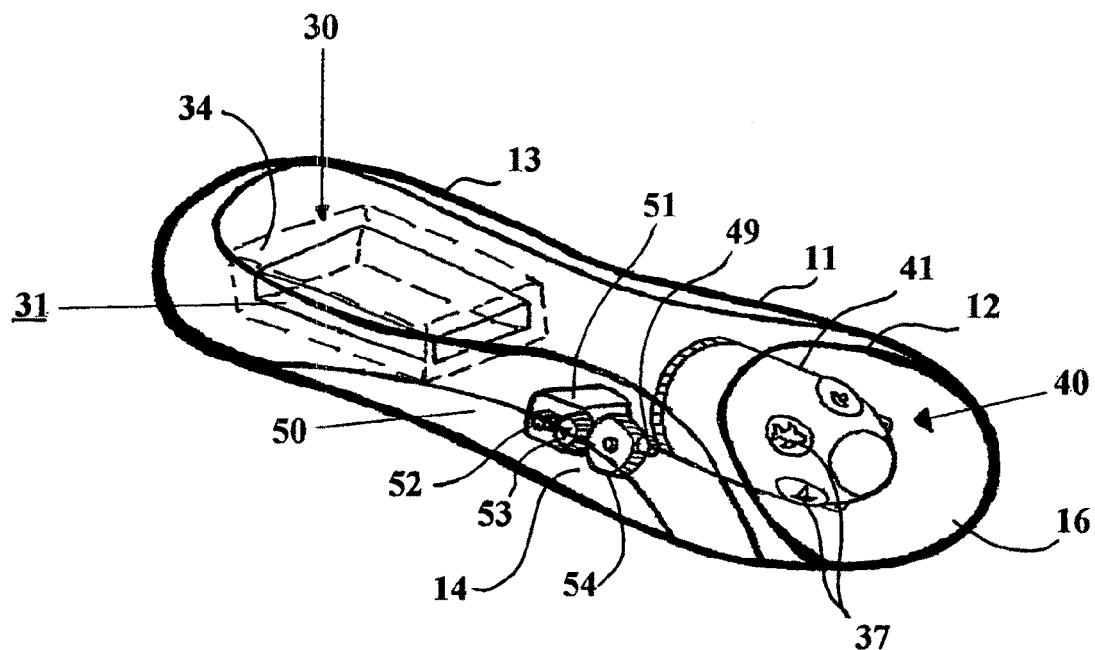
FIG. 4 is a perspective view of the 3-D Nightlight illustrated in FIG. 1 with parts broken away to reveal the components contained within the nightlight illustrating one means for rotating the projection assemblage.

FIG. 4 illustrates the internal components of the 3-D Nightlight of the invention comprising a power package to provide a power source generally indicated by reference numeral 30, a projection assemblage generally indicated by reference numeral 40, a lens extension to projection assemblage generally indicated by reference numeral 37 and a means to rotate the projection assemblage 40 generally indicated by reference numeral 50. The intermediate gears 52, 53, 54 and 49 allow movement of the projection assemblage. The power package 30 is used to provide electrical power and can be provided from any commercially available selection of power sources such as a Lithium rechargeable battery 31, dry cell batteries including AAA batteries that are positioned to contact conventional conducting plates or strips 34. Using conventional means such as coil springs, the positive ends (anode ends) of the battery 31 can be urged to contact the conducting plates or stripes 34.

Figure 4A:
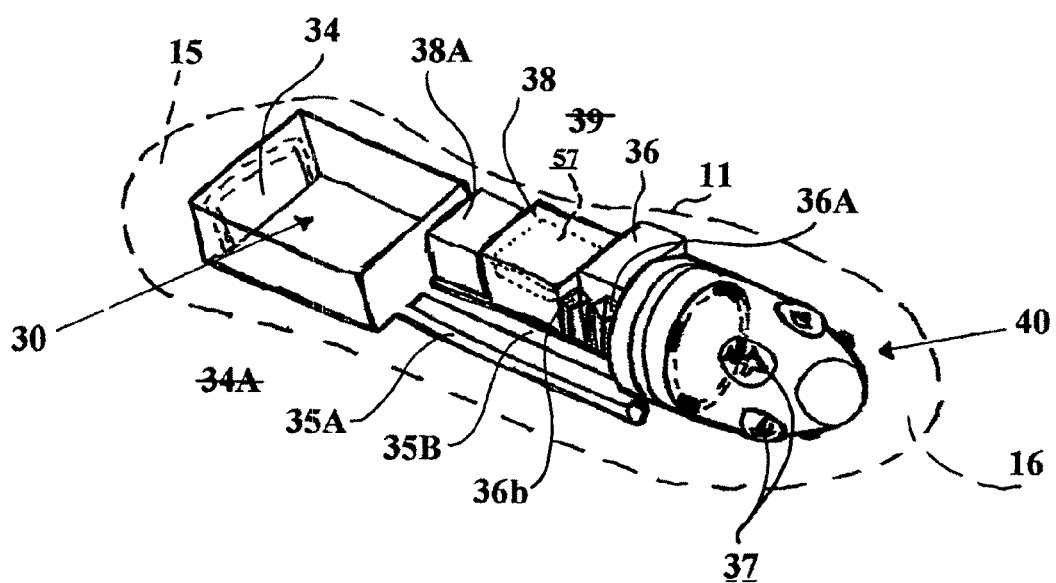
FIG. 4A is an elevation view with parts broken away to reveal the components contained within the nightlight illustrating the micro processor and mother board for the memory card slot access of the nightlight and power connecting stripes to projection assemblage.

FIGS. 4a illustrates details of the 3-D Nightlight including; power strips 35a and 35b contact with the projection module 36 and projection assemblage 40. The interactive module 38 contains a micro processing projection module 36 and said module located behind the projection assemblage 40 is accessible for memory card 57 containing data for the interactive nightly adventure mode. The interactive computer chip 38a processes the data programming for storage and playback feature via the micro processing modules 36a and 36b for the interactive play mode.

The projection assemblage 40 includes a light emitting device member in the form of, but not limited to, a geometric form of a projectile, a plurality of light emitting elements 45 as a secondary light source, nested within the said member, The primary illumination means provide the lighting to shine brighter than the remaining lights of the nightlight in the form of a light beam with a wide spectrum; the projected light can be focused into a highly concentrated beam of light illuminating a wider area.

In the embodiment illustrated in FIG. 4, the rotation means 50 used to provide rotation to the projection assemblage 40 comprises, for example, a device that converts electric current into mechanical energy 51 and a plurality of intermeshing sprockets such as rear sprocket 52, intermediate sprocket 53 and front sprocket 54. A spindle 55 extending outwardly from 51 and secured to the center hub of rear sprocket 52 causes the rear sprocket 52 to rotate which, in turn, causes the intermediate sprocket 53 and front sprocket 54 to rotate.

Figure 5:
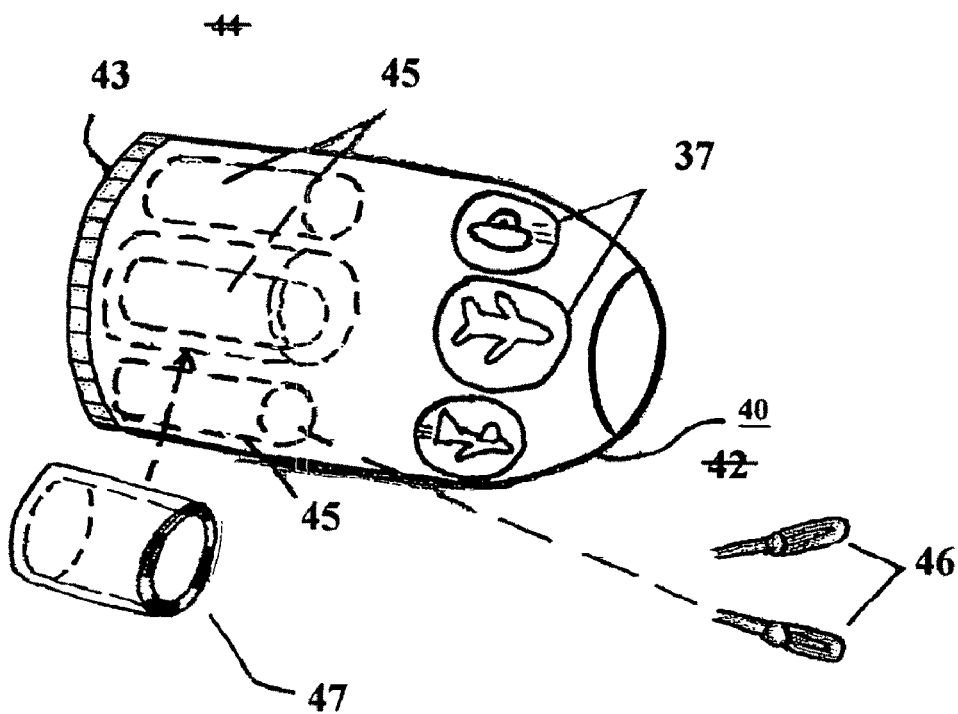
FIG. 5 is a partially exploded elevation view of the light emitting device carrying member of the nightlight; and, FIG. 5a is a partially exploded view of the nightlight illustrating the rotating mechanism of the projection assemblage; and, FIG. 6 is a perspective view showing the projected images viewed through the additional pop up design 3-D lens.
Figure 5A:
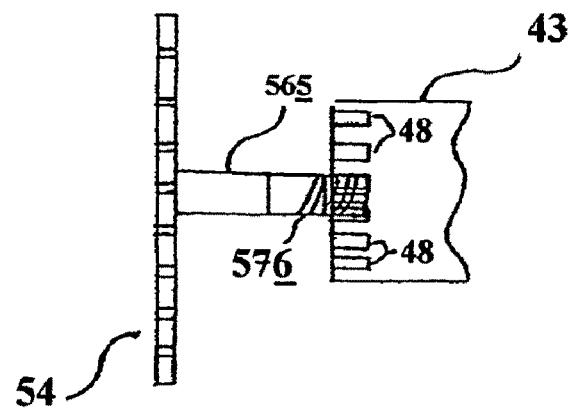

As more clearly shown in FIG. 5A, the front sprocket 54 has an inwardly extending spindle 55 with a worm gear 56 at its inner end that is positioned to engage cogs 48 provided on the outer surface of the end of the projection assemblage 43. Thus, when power is supplied from the power source 30, the device that converts electric current into mechanical energy serves to rotate the sprockets 52, 53 and 54 as well as the spindle 55 bearing worm gear 56 to rotate the projection assemblage 40 at the open front oblate end 16 of the nightlight 10.

As can be seen if FIG. 5, light emitting element housing 42 is in the form of a projectile and has a plurality of light emitting device receptacles 45 formed in its outer surface to receive additional light emitting elements 46 therein. The light emitting elements that can be used are commercially available and are widely known as LED (Light Emitting Diode). These miniature light emitting elements provide a secondary source of illumination for the night light of the invention.

The primary source of illumination for the nightlight is provided, for example, by a light 47. Light 47, positioned to nest within the projection assemblage 40 as indicated in FIG. 5. Light 47 is a commercially available LED capable of projecting a beam of light; the projected light can focus into a light beam of various dimensions.

The light emitting elements can be all of various monochromatic colors such as red, orange, yellow, green, blue, indigo and violet, or mixtures and combinations thereof. Preferably, the light emitting device is in the form of a white beam while the light emitting elements can be mixtures and combinations of colors.

The device that converts electric current into mechanical energy 51 that can be used are commercially available and is of the type typically employed in remote control devices to power, steer and manipulate powered toy cars and airplanes.

FIG. 5a illustrates the rotating mechanism of the projection assemblage.

Figure 6:
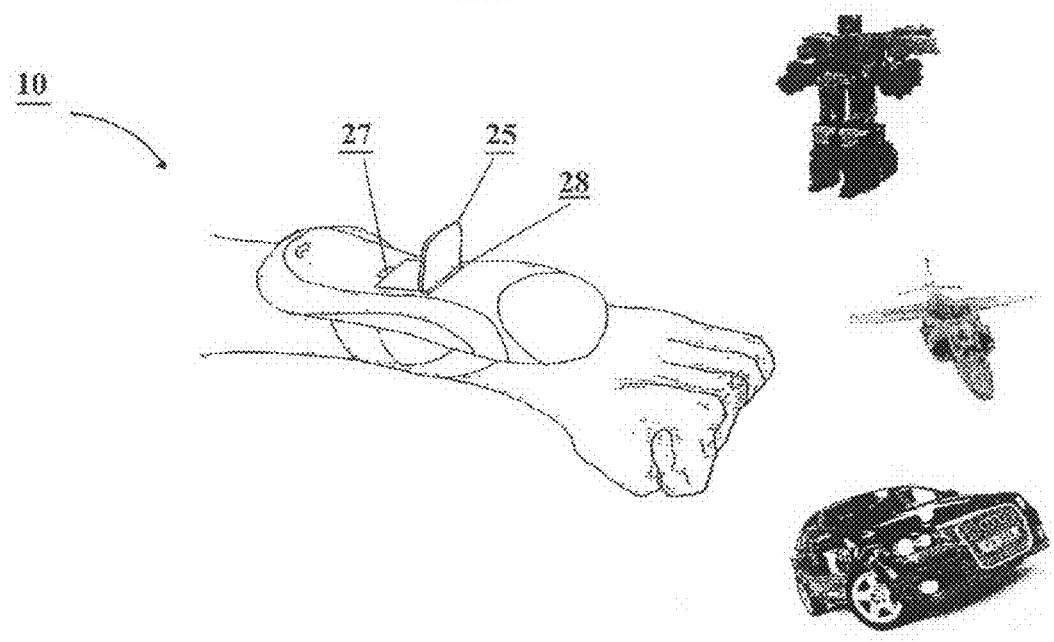
FIG. 6a is a perspective view showing the projected images viewed through the 3-D glasses.

FIG. 6 illustrates the 3-D nightlight 10, in perspective view illustrating the button 27 as activated, initiating the spring release design 28 of 3-D lens 25.

Figure 6A:
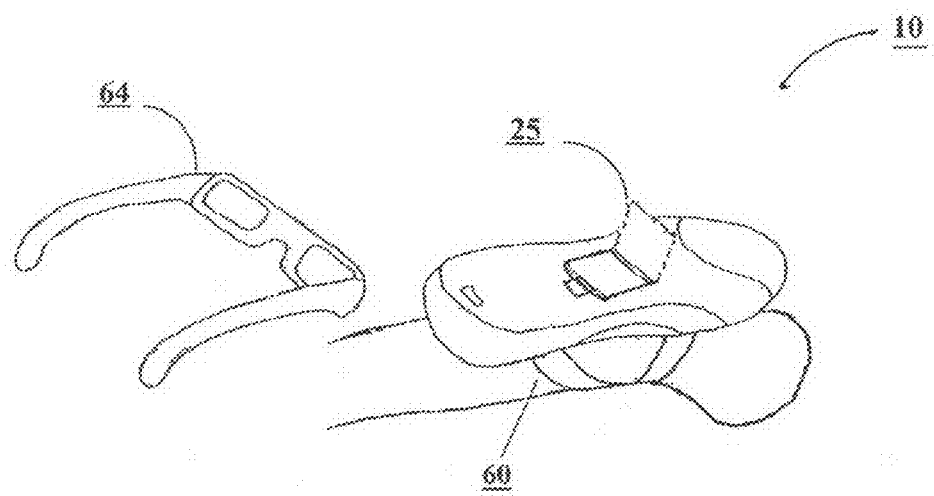

FIG. 6a illustrates the nightlight 10, for example, secured to the lower arm of a user 60, while the user is viewing the images by means of the 3-D glasses 64.

Figure 7:
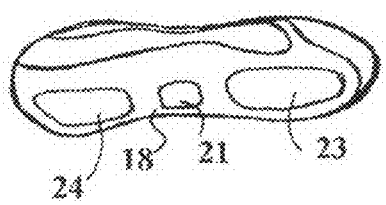
FIG. 7 is a perspective view illustrating compartments to access the power source and projection assemblage of the invention.

FIG. 7 is a perspective view illustrating the compartments to said projection assemblage and power source area. Accessible compartments 23 and 24 can be provided on either the top 17 or the bottom 18 of the casing or housing 11 (here shown on the bottom 18 of the casing or housing 11). The accessible compartment covers 23 and 24 provide access to the power source and projection assemblage compartments within the casing or housing 11 and function similar to slide/snap fit covers used to access battery compartments of commercially available portable telephones and cameras.

Figure 8:
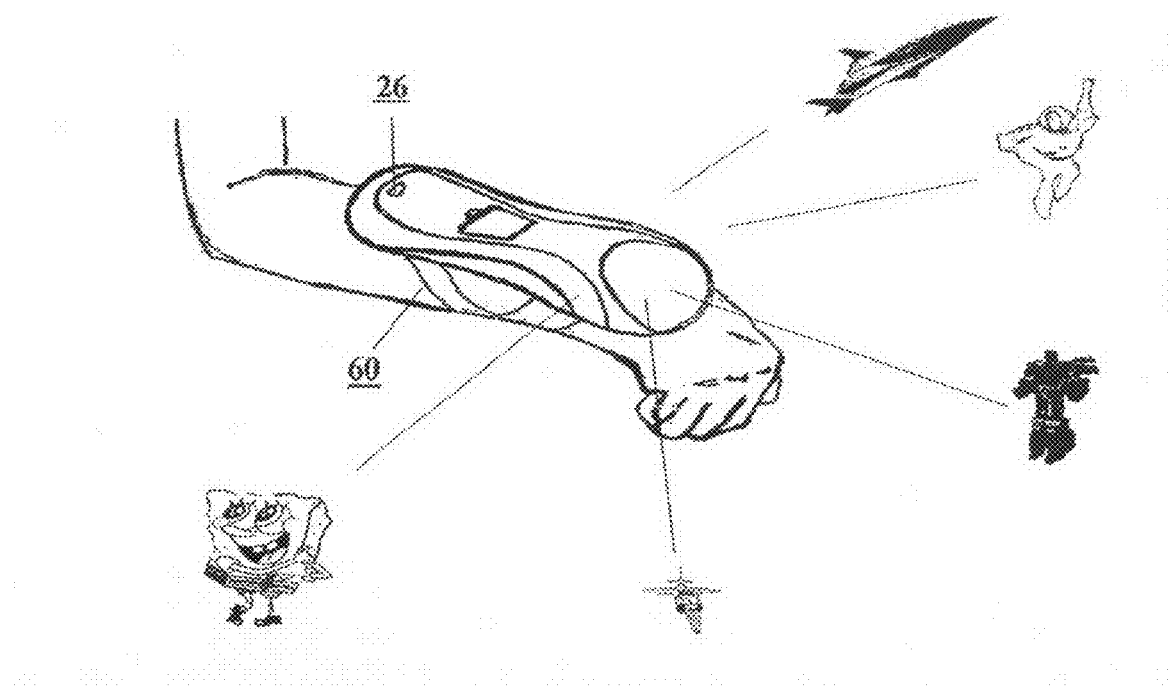
FIG. 8 is a perspective view illustrating the nightlight in panic mode blast away feature; illuminating all lights of the invention.

FIG. 8 illustrates the nightlight secured to the lower arm of a user 60, displaying the various lights of the invention upon pressing panic mode button 26.

Figure 9:
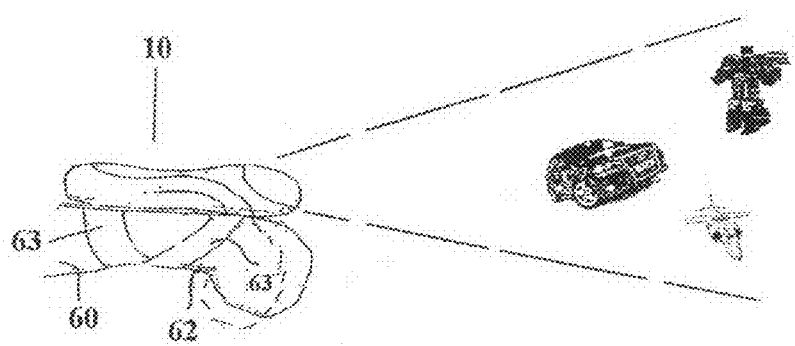
FIG. 9 is a schematic elevation view illustrating the nightlight in use, for example, worn on the arm of a user.

FIG. 9 illustrates the nightlight 10 secured to the lower arm 60 of a user adjacent wrist 62 area, for example, by means of an elastic band or Velcro straps 63. As shown, a variety of images can be projected by the projection means onto a ceiling of a wall area in various forms such as space ships, laser blast, exploding cars, zooming jet planes, stealth Navy ships.

Figure 10:
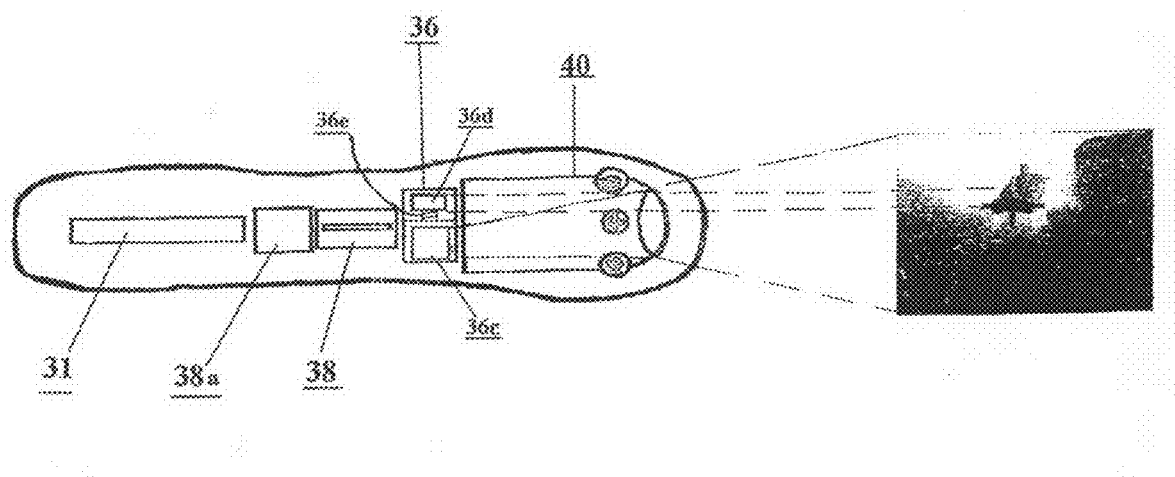
FIG. 10 is an end view illustrating the nightlight in the interactive nightly adventure mode.

FIG. 10 illustrates the nightlight displaying the rechargeable lithium battery 31, projection module 36, the micro processing interactive module 38, the interactive computer chip 38a, the micro projectors 36c and 36d and the spring 36e, which allows for the gyroscopic effect within projection module 36 and projection assemblage 40.

Figure 11:
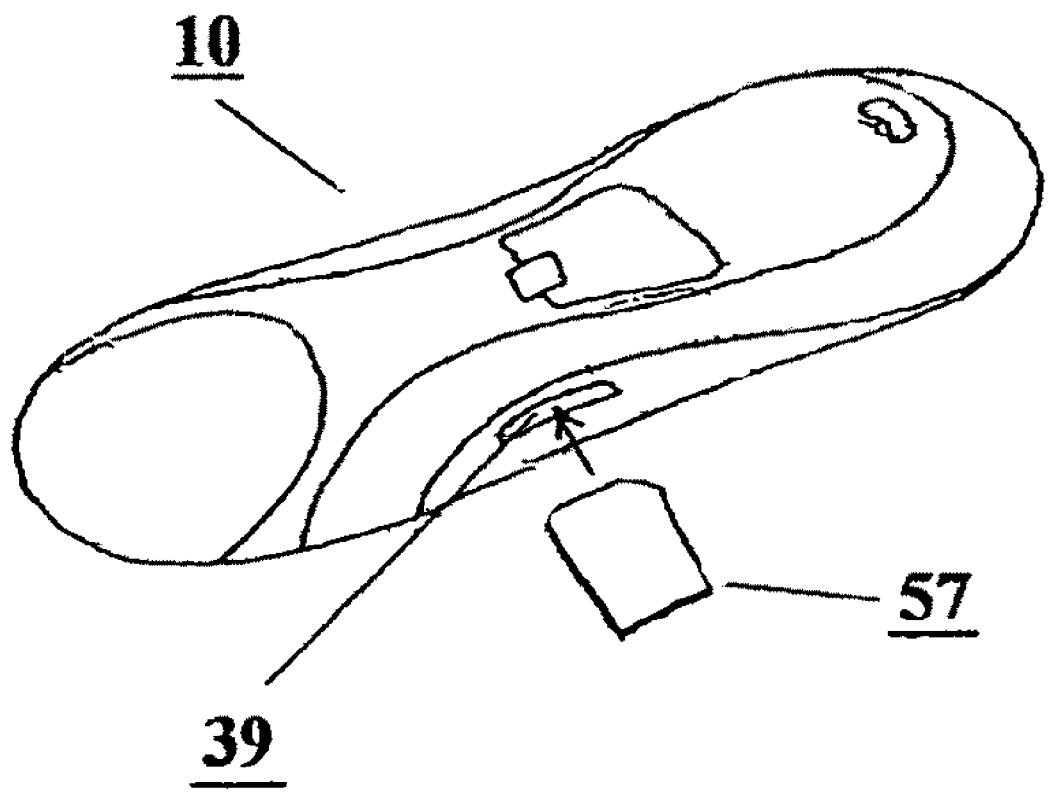
FIG. 11 is a perspective view illustrating the nightlight and memory card slot.

FIG. 11 illustrates the 3-D nightlight 10 displaying the memory card 57 and memory slot 39.

Except for the conducting metals, the device that converts electrical current into mechanical energy, such as a motor and the power source, the materials used to fabricate the nightlight of the invention can be provided from any suitable source such as metal, wood, plastics, and the like as well as combinations thereof. Preferably, durable and lightweight plastic materials such as high density polyethylene, polypropylene, polysulfones, polystyrene and the like can be used. The front oblate end should preferably be provided from non-shattering material such as celluloid or Plexiglas.

Although the invention has been described in some detail and with particularity, it will be appreciated by those skilled in the art that various changes and modifications can be made therein without departing from the scope and spirit of the invention. Any variation on the theme and methodology of accomplishing the same that are not described herein would be considered under the scope to the present invention.

The invention claimed is:

1. A 3-D Nightlight comprising:
   (a) an extended casing in the form of an ergonomic geometric configuration having an oblate rear end, an oblate front end, a top, a bottom, opposed sides and a tapered or pinched mid-section joining said front and rear oblate ends;
   (b) a projection assemblage comprises a light emitting device housing that contains a primary illumination, and a secondary illumination, the light emitting device housing is located within the extended casing adjacent the oblate front end:
      (I) the primary illumination is capable of out shining the secondary illumination, the secondary illumination includes a plurality of receptacles formed about an outer surface of the light emitting device housing which contain light emitting diodes and six lenses with varied images located on a surface of the lenses;
      the primary illumination is nested within the projection assemblage;
      a motor, a plurality of intermeshing sprockets and associated spindles causing the projection assemblage to rotate;
   an energy supply located within the extended casing adjacent the rear oblate end;
   a first push button to activate and deactivate the energy supply to initiate power to the projection assemblage;
   a second-push button to activate and deactivate panic mode initiation the primary and secondary illumination to activate simultaneously;
   and a third push button to release a tension spring allowing a position of 3-D lens to change from a horizontal to a vertical position, the 3-D lens capable of allowing projected images to appear in a 3-D aspect while being illuminated;
   and compartments for the projection assemblage and the energy supply, the energy supply comprising a rechargeable battery, the compartments allowing for easy access to the projection assemblage and the rechargeable battery;
   an interactive device containing an interactive computer chip that automatically processes data containing interactive nightly adventures stored on a memory storage device, the data is used for an interactive play feature displayed by a projection module, the projection module contains a first and second micro projector, the first micro projector projects a background video, the second micro projector projects an interactive vehicle image onto the background video, the interactive vehicle image to be manipulated by a soft spring gyroscopic effect which is caused by the movement of the nightlight.

2. The 3-D Nightlight of claim 1, wherein a color of said secondary illumination are selected from a group of white, red, orange, yellow, green, blue indigo and violet as mixtures and combinations thereof.

3. The 3-D Nightlight of claim 1, wherein said light emitting device housing, receives the primary illumination, that provides a beam of light with a wide spectrum.

4. The 3-D Nightlight of claim 1, wherein said rechargeable battery is provided, by a rechargeable lithium battery.

5. The 3-D Nightlight of claim 1, wherein said oblate front end should preferably be provided from non-shattering material such as celluloid or Plexiglas and mixtures and combination thereof.

6. The 3-D Nightlight of claim 1, the memory storage device includes a memory card that contains the data containing the interactive nightly adventures;
   the memory card supplies the data to the storage medium device.

* * * * *